March 18, 1952 — C. B. HAY — 2,589,611
COAT-TREE FOR PASSENGER VEHICLES
Filed Sept. 20, 1949 — 2 SHEETS—SHEET 1
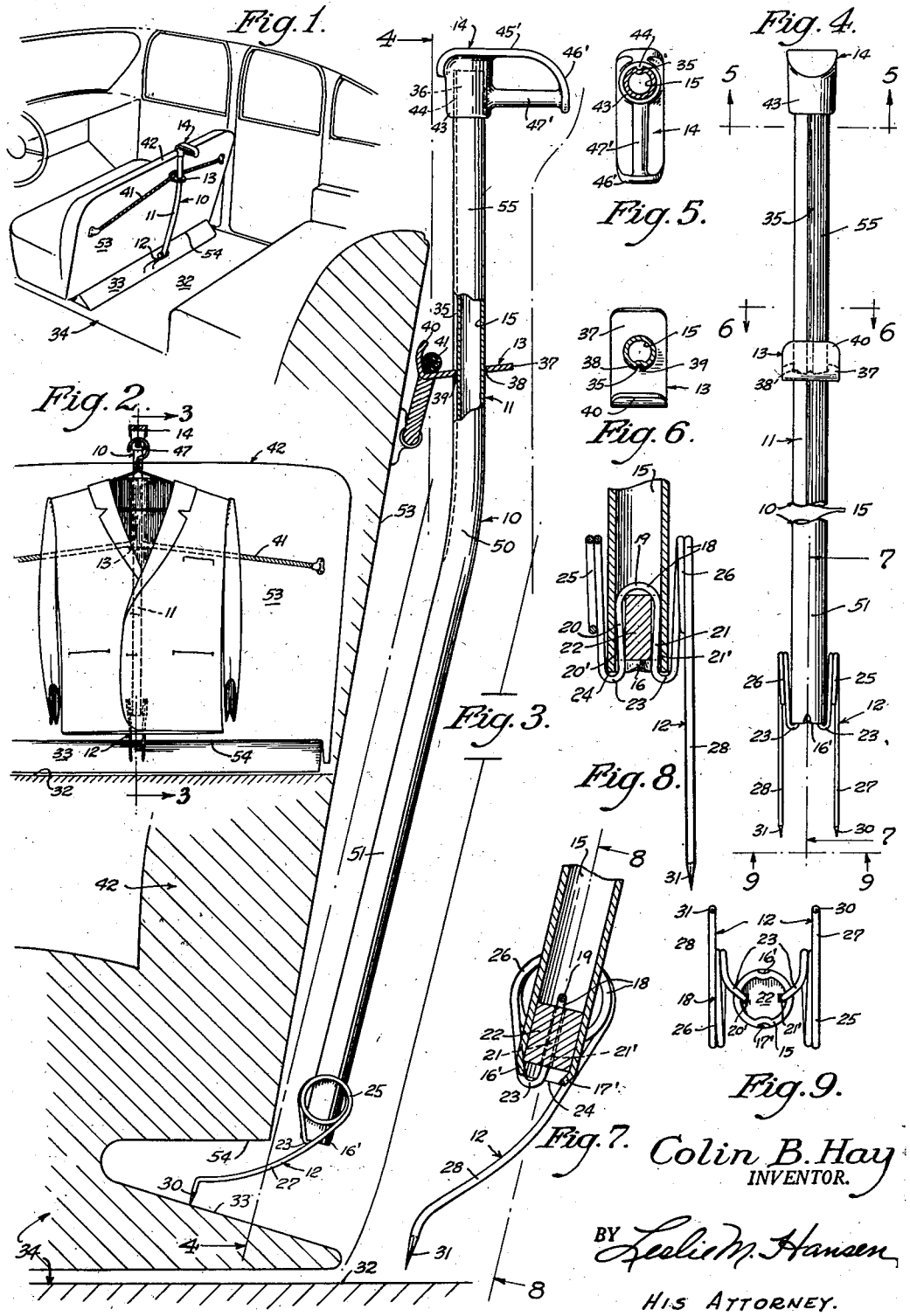
Colin B. Hay
INVENTOR.
BY Leslie M. Hansen
HIS ATTORNEY.

March 18, 1952 C. B. HAY 2,589,611
COAT-TREE FOR PASSENGER VEHICLES
Filed Sept. 20, 1949
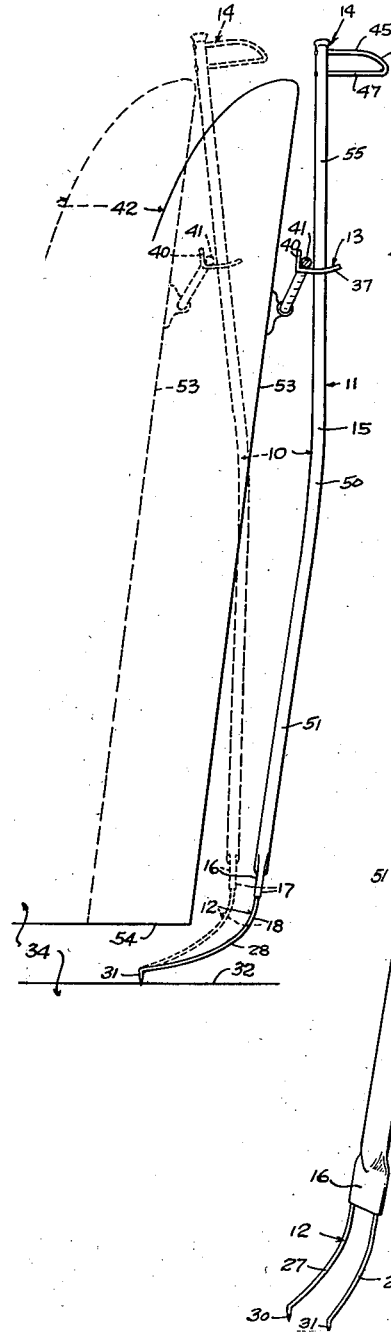
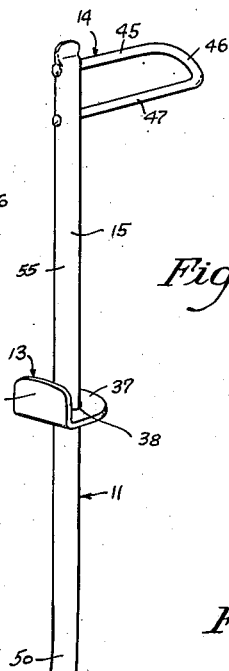
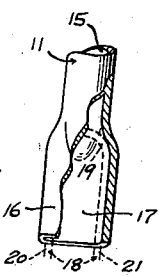
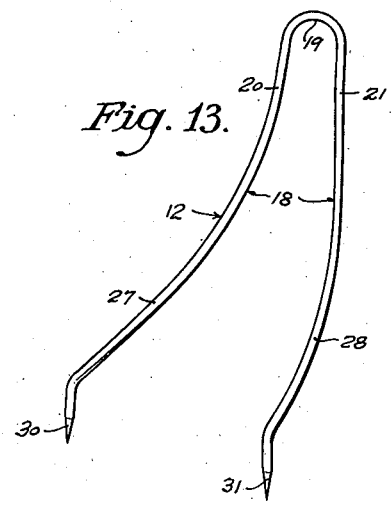
INVENTOR.
Colin B. Hay
BY
Leslie M. Hansen
HIS ATTORNEY.

Patented Mar. 18, 1952

2,589,611

UNITED STATES PATENT OFFICE 2,589,611

COAT-TREE FOR PASSENGER VEHICLES

Colin B. Hay, San Jose, Calif., assignor of one-half to Thomas Bellmont Keesling, Los Gatos, Calif.

Application September 20, 1949, Serial No. 116,775

13 Claims. (Cl. 224—29)

This invention relates to clothes hanging devices and more particularly to a coat-tree adapted for self-fastening adjacent the back of the front seat of a passenger vehicle.

It is one object of this invention to provide a clothes hanging standard which is simple in construction, economical in manufacture and highly efficient in use.

The device of the present invention is calculated to provide a sturdy detachable coat-tree for the interior of vehicles which coat-tree facilitates the hanging of a plurality of garments in a neat and non-folded condition, without obstructing any of the visibility of the driver through either the rear or side windows of the vehicle, or the visibility of rear seat passengers through the front and side windows.

Another object is to provide a standard upon which to support garments on conventional coat-hangers and which will adapt itself for attachment to the vehicle between its robe cord and the floor or the like of the vehicle.

Another object is to provide a coat-tree standard having a yieldable foot and a sliding anchorage cooperable with each other for securing the coat-tree between a robe cord and the floor of the vehicle in which it is to be used.

It is a further object of this invention to provide a coat-tree standard adapted for fastening adjacent the rear wall of a vehicle seat and so configurated as to enable its attachment between a robe cord or the like and a foot rest, both of which are movable with the vehicle seat.

These and other objects and advantages will become apparent from a reading of the following specifications and claims in the light of the accompanying drawings, in which:

Fig. 1 is a perspective view of the interior of a vehicle illustrating my coat-tree in association therewith.

Fig. 2 is a partial elevation of the seat shown in Fig. 1 and with a coat and hanger supported on the coat tree.

Fig. 3 is a side elevation of my new coat-tree, partially in section, and taken substantially along line 3—3 in Fig. 2.

Fig. 4 is an elevational view of the coat tree of Fig. 3 as seen from line 4—4 thereof.

Fig. 5 is a section taken at line 5—5 in Fig. 4.

Fig. 6 is a section taken along line 6—6 in Fig 4.

Fig. 7 is a vertical section taken along line 7—7 in Fig. 4.

Fig. 8 is a section taken along line 8—8 in Fig. 7.

Fig. 9 is a bottom view as seen from line 9—9 in Fig. 4.

Fig. 10 is a view similar to that of Fig. 3 showing the preferred form of my invention in use.

Fig. 11 is an enlarged perspective of the preferred form of my coat tree.

Fig. 12 is a fragmentary perspective of a portion of the foot of the coat tree shown in Fig. 11 while Fig. 13 is a perspective view of the spring foot about to be inserted into the foot portion shown in Fig. 12.

The coat-tree 10 of the present invention, Figs. 1 to 4, 10 and 11, comprises a standard 11 having a yieldable foot 12, a slidable fastening means 13 and a head 14 all united to form a complete unit which may be stored in a very small space as for instance the deck, not shown, usually provided between the rear window and the back of the rear seat of a conventional closed car.

The standard 11 is preferably formed from a single length of metal tubing 15 which will be rigid enough to withstand bowing or bending other than by abnormal pressures.

The yieldable foot 12 is applied to the lower end of the tube 15 and is preferably secured within the open lower end of the latter by pinching the sides of the tube as shown at 16 and 17, Figs. 11 and 12. In the preferred embodiment the foot 12 comprises a single length of spring wire 18 having a U-shaped or humped mid-portion 19 of such configuration as to fit snugly within the open lower end of the tube 15. The two legs 20 and 21 of the spring wire 18 tend to spread and thereby engage the inner side walls of the tube. Consequently, upon insertion of the mid-portion 19 into the flattened end of the tube, the wire foot is secured in place thereon.

A modified form of mounting of the spring foot 12 is shown in Figs. 3, 7, 8 and 9 in which the open lower end of tube 15 is not normally flattened. In this form in order to assure proper securing of the hump 19 within the tube 15, the hump is mounted with its legs 20 and 21 disposed within grooves 20' and 21' formed lengthwise in the outer portion of a short bar 22 of cold rolled steel. This bar 22 slidably fits into the open lower end of the tube and the pinched portions 16' and 17' of the latter prevent the bar from coming out of the tube. The two legs 20 and 21 of the spring wire 18 are bent back as at 23 around the lower edge 24 of the tube and each leg is turned to provide several convolutions 25 and 26.

Each leg 20 and 21 of the spring wire 18 in either form of the foot terminates in an elongated tine 27 and 28, respectively, so configurated as to extend in parallelism. Each tine 27 and 28 is bent at its end to extend substantially parallel to the axis of the tube 15, but offset relative thereto, and is provided with a pointed end 30 and 31, respectively, adapted to be imbedded in the carpeting or floor covering on the floor 32 or foot rail 33 of the vehicle 34 in which the coat tree 10 is to be used.

It will be understood that the modified form of convoluted spring foot is interchangeable with the plain one of Figs. 11 and 13. That is to say, the hump portion of the convoluted spring foot, Figs. 5, 7, 8 and 9 also will fit the flattened end of the tube shown in Fig. 12.

The fastening means 13 comprises a strip of metal 37 having an aperture 38 of slightly larger diameter than the diameter of the tube 15 so as to loosely fit the same for sliding movement relative thereto. It will be noted in Figs. 10 and 11 that the strip of metal has a slight upward bend in the region of the aperture remote from the upwardly curled end of the strip. By this construction the upwardly bent part of the strip will dig into the tube when a downward pressure is applied to the curled end 40.

That end of the strip adjacent the portion 39 thereof is curled upwardly as at 40 and is adapted to be hooked under a conventional robe hanging cord 41 which is usually provided on the back wall of a vehicle seat 42.

If desired the tube 15 may be provided with a groove 35 on that side thereof to which the pointed tines 27 and 28 extend relative to the tube, see Figs. 3, 4 and 6. This groove 35 extends from the upper end 36 of the tube 15 to about midway its ends and forms a guide and keeper for the slidable fastening means 13 hereinbefore referred to. In this form of fastening means 13 the metal strip 37 is provided with a portion 39 which extends into the aperture 38 and is so configurated as to fit into the groove 35. In this manner the strip 37 is restrained against rotative movement about the tube 15 and when tilted relative thereto will bindingly engage the same and be locked in a particularly desired elevation lengthwise of the tube.

The head 14 in its most simple form comprises a heavy rod 45 bent downwardly at its mid-portion as at 46 and backwardly to provide a hanger rod 47 in parallelism with the uppermost portion of the rod 45. The two ends of rod 45 are then inserted through a pair of holes provided in the upper end of the tube 15 and the ends of the rod 45 hammered over to provide enlarged heads. The open upper end of the tube 15 is then pinched flat as shown in Figs. 10 and 11.

The head 14 may be die cast and applied to the upper end of tube 15 as illustrated in Figs. 3, 4, and 5. This form of head has a boss formation 43 which is suitably secured to the upper end 36 of the tube 15 and keyed with respect thereto by an integral rib 44 which fits into the groove 35. (See Fig. 5.) This die cast head has a flat upper surface 45' simulating a cane handle and having a downwardly curved tail portion 46' formed integrally with a hanger rod 47' which extends from the boss formation 43 substantially perpendicular to the axis of the tube 15. The flat upper surface 45' and its curved tail portion 46' serve as a blunt surfaced guard over the boss 43 and rod 47' to prevent injury to anyone should they accidentally bump into the upper portion of the coat-tree 10. These two surfaces 45' and 46', simulating a cane handle, also serve as a grip whereby the coat-tree can be manipulated and pressed downwardly by one hand of a person as he used his other hand to pull upwardly upon the slidable fastening means 13.

In applying the coat tree 10 to the vehicle 34 within which it is to be used, the tree 10 is held as a cane would be and the pointed ends of the tines 27 and 28 set into the floor of the vehicle 34. The tree 10 is then pressed downwardly against the action of the spring foot 12 and the slidable fastening means 13 pulled upwardly with its curled up portion 40 hooked under the robe cord 41. These robe cords 41 are often provided with an internal spring or spring anchorages at their ends, in which event they tend to stretch under the upward pull of the fastening means 13 as explained above. However, in the absence of expansibility of the robe cord, the yieldability of the convoluted portion 25 and 26 of the wire spring 18, as well as the flexibility of the tines 27 and 28, is sufficient to create a binding attachment of the coat-tree between the floor 32 and the robe cord 41 of the vehicle.

It should be noted that the coat-tree shown is especially adapted for attachment to an adjustable type of front seat of a vehicle. To this end the tube 15 is bent as at 50 so that its lower portion 51 converges slightly with respect to the tilted back 53 of the front seat 42 of the vehicle. In this manner the tines 27 and 28 are adapted to extend beneath the lower edge 54 of the seat 42 with the pointed ends of the tines imbedded in either the floor 32 or the foot rail 33 which moves with the adjustable carriage of the front seat. Moreover, the bend 50 in the tube 15 makes it possible to dispose the upper end 55 of the coat-tree standard in a truly vertical position with the rod 47 horizontally disposed.

It will be apparent that even though the seat with which the coat-tree is associated is movable the coat-tree will follow the movable seat. In other words, when the spring foot rests on the movable foot rail 33 the disposition of the coat-tree relative to the seat is not disturbed. On the other hand, if the spring foot rests on the permanent floor 32 of the vehicle, the coat-tree will rock fore and aft with the movable seat when the same is adjusted, see Fig. 10.

From the foregoing it will be apparent that movement of the seat 42 forward or backward in no way effects the attachment of the coat-tree to the seat and its carriage. Consequently, there is little likelihood of the coat-tree becoming loosened or displaced relative to the seat to which it is attached.

The coat-tree 10, herein explained, provides ample rod space for several coat hangers with clothing thereon. The clothing supported on the coat-tree will in no way create obstruction of the driver's vision through either rear or side windows of the vehicle cab. Neither will clothing on the coat-tree obstruct the vision of rear seat passengers with respect to the front or side windows of the vehicle.

The coat-tree may easily be removed by depressing the handle-like head 14 on the standard 11 so as to cause the spring-type foot 12 to yield, thereby releasing the binding action of the robe cord 41 upon the fastening means.

While I have described a device embodying one specific form of my invention it will be apparent that the same may be varied, modified or altered in many respects without departing from the spirit of this invention. I therefore desire to avail myself of all variations, modifications or alterations which fairly fall within the scope of the following claims.

What I claim as new and desire to protect by Letters Patent is:

1. The combination with a standard for a coat-tree or the like for use interiorly of the cab of closed vehicles of means for securing said standard in a substantially erect position within the cab of a closed vehicle comprising yieldable means on one end of said standard adapted to rest upon a stationary surface such as the floor of the vehicle for exerting an upward thrust against said standard when said yieldable means is depressed, and a fastening means on said standard in the upper region thereof adapted to engage a relatively fixed bead or projection within the cab of said closed vehicle above said stationary surface in the latter for counteracting the upward thrust exerted upon said standard by said yieldable means to thereby bindingly secure said standard between said floor surface and said relatively fixed bead or projection above the same.

2. The combination with a standard for a coat-tree and the like to be used interiorly of the closed cab of a vehicle, of means for supporting said standard in a substantially vertical position within the closed cab of a vehicle comprising yieldable means on the lower end of said standard for engaging a stationary surface for exerting an upward thrust against said standard when the latter and said yieldable means are manually depressed, and a fastening means slidably mounted on said standard adapted to bindingly engage the same when tilted relative thereto upon engagement with a relatively fixed bead or projection above said stationary surface for restraining upward movement of said standard against the action of said depressed yieldable means to thereby secure said standard in a vertical position between said stationary surface and said relatively fixed bead or projection above the same.

3. A coat-tree for a vehicle having a seat provided with a fixed projection on its rear wall comprising a standard having a head portion, fastening means slidable upon said standard for manual adjustment into engagement with the fixed projection on the rear wall of said seat, and a spring means on said standard adapted to exert an upward pressure thereto for effecting binding engagement of said fastening means with the fixed projection on the rear wall of said vehicle seat.

4. In a coat-tree adapted to be fastened adjacent the rear wall of a conventional vehicle seat having a robe support thereon, the combination therewith of a standard, fastening means slidable on said standard for engagement with said robe support and adapted to bindingly engage said standard when tilted relative thereto, and yieldable means on said standard adapted to be depressed during sliding of said fastening means into engagement with said robe support and for effecting an upward pressure of said fastening means against said robe support for securing said standard between the robe support and the floor of the vehicle.

5. A coat-tree of the class described comprising a standard, a foot on said standard adapted to yield upon being pressed against a floor surface for adheringly engaging said floor surface and thereby exert an upward thrust against said standard, and means on said standard in the region of the upper end thereof adapted to engage a projection fixed above and relative to said floor surface for counteracting the upward thrust exerted against said standard by said yieldable foot to thereby secure said standard in a vertical position.

6. A coat-tree adapted to be fastened adjacent the rear wall of a conventional vehicle seat having a robe support thereon, comprising a standard having a head portion provided with a hanger rod, a fastening means on said standard adapted to tilt into binding engagement therewith upon application of a thrust against one extended end of said fastening means, means on said one extended end of said fastening means for engaging the robe support on the rear wall of said vehicle seat, and a yieldable foot on said standard adapted to be compressed against the floor of the vehicle incident to engagement of said fastening means with said robe support and for exerting an upward thrust to said standard and fastening means whereby to effect tilting of the latter into binding engagement with said standard.

7. A coat-tree of the class described comprising a standard having a head portion providing a hanger rod, a yieldable foot for said standard, a fastening means slidable axially on said standard, said standard having a guide groove, and a keeper on said fastening means extending into said groove for preventing turning of said fastening means about said standard, said fastening means being adapted to tilt into binding engagement with said standard upon application of a thrust against one extended end of said fastening means.

8. A coat-tree comprising a tubular standard having a guide groove formed lengthwise thereof in its upper portion, a hanger rod head keyed to the groove at the upper end of said standard, a plate having an aperture adapted to fit said tubular standard and having a keeper extending into said guide groove, and a spring wire foot having a humped mid portion secured within the open lower end of said tubular standard, said spring wire foot being adapted to engage a floor surface for yielding action under downward pressure against said head and for effecting tilting of said plate into binding engagement with said standard upon engagement of one edge of said plate with a relatively stationary projection above said floor surface.

9. In combination with the robe support and foot rail of an adjustable seat and carriage therefore, a coat-tree comprising a standard, a yieldable foot on said standard having a pronged end for engaging said foot rail, and a fastening means on the upper portion of said standard for engagement under said robe support during depression of said yieldable foot whereby the latter effects an upward thrust upon said standard for bindingly engaging the standard with said fastening means due to obstruction of the latter by said robe support.

10. In combination with the robe support on the rear wall of an adjustable vehicle seat and the stationary floor therebeneath, a coat-tree comprising a standard having a hanger rod in the region of its upper end, a fastening means on said standard movable into engagement with the under side of said robe support, and a yieldable foot on said standard having a pronged end adapted to dig into the covering of said stationary floor to anchor said yieldable foot relative to the adjustable vehicle seat, said yieldable foot being compressible for exerting an upward thrust to said standard for bindingly urging said fastening means against the underside of said robe support and for yielding during adjustment of said adjustable vehicle seat relative to said stationary floor.

11. In combination with a robe support or like projection on the rear wall of a vehicle seat and the floor therebeneath, a coat-tree comprising a standard, a yieldable foot on said standard having a pointed end for engaging said floor, a fastening means movable lengthwise of the upper portion of said standard for manual positioning opposite said robe support, said fastening means having a hooked edge for engaging said robe support from below, and means operatively connecting said fastening means with said standard to thereby assure against creeping of said fastening means relative to said standard during upward pressure of said standard by said yieldable foot.

12. In combination with a robe support or the like on the rear wall of a vehicle seat and the floor therebeneath, a coat-tree comprising a standard, a yieldable foot on said standard for resting the same on said floor and adapted to yield upon downward pressure for exerting an upward thrust to said standard, and a fastening means on said standard opposite said robe support and engageable with the latter for resisting upward movement of said standard under the influence of said yieldable means.

13. In combination with a robe support or the like on the rear wall of a vehicle seat and the floor therebeneath, a coat-tree comprising a standard, a foot for said standard including a pair of tines convoluted between their ends and secured to the lower end of said standard, said tines having pointed ends adapted to imbed within the floor covering on said floor to facilitate compression of said convoluted tines whereby the latter will effect an upward thrust to said standard, and a fastening means on said standard opposite said robe support and engageable with the latter for resisting upward movement of said standard under the influence of said depressed convoluted tines.

COLIN B. HAY.

REFERENCES CITED

The following references are of record in the file of this patent:

UNITED STATES PATENTS

| Number | Name | Date |
| --- | --- | --- |
| 1,912,514 | Curtis et al. | June 6, 1933 |
| 2,015,976 | Trepte et al. | Oct. 1, 1935 |
| 2,196,196 | Dorsey | Apr. 9, 1940 |
| 2,483,043 | Golden | Sept. 27, 1949 |

FOREIGN PATENTS

| Number | Country | Date |
| --- | --- | --- |
| 370,938 | Germany | June 3, 1921 |